United States Patent
Fan et al.

(10) Patent No.: US 12,007,021 B2
(45) Date of Patent: Jun. 11, 2024

(54) MOTOR CONTROL METHOD AND DEVICE OF BISTABLE GEAR SHIFTER AND AUTOMOBILE

(71) Applicant: GUANGZHOU AUTOMOBILE GROUP CO., LTD., Guangzhou (CN)

(72) Inventors: Hanmao Fan, Guangzhou (CN); Jiangang Liang, Guangzhou (CN); Zhenwen Chen, Guangzhou (CN); Ming Li, Guangzhou (CN); Huonan Tan, Guangzhou (CN)

(73) Assignee: Guangzhou Automobile Group Co., Ltd., Guangdong (CN)

( * ) Notice: Subject to any disclaimer, the term of this patent is extended or adjusted under 35 U.S.C. 154(b) by 125 days.

(21) Appl. No.: 17/756,559

(22) PCT Filed: Jun. 1, 2021

(86) PCT No.: PCT/CN2021/097620
§ 371 (c)(1),
(2) Date: May 26, 2022

(87) PCT Pub. No.: WO2021/244511
PCT Pub. Date: Dec. 9, 2021

(65) Prior Publication Data
US 2022/0356945 A1 Nov. 10, 2022

(30) Foreign Application Priority Data
Jun. 4, 2020 (CN) .......................... 202010497718.1

(51) Int. Cl.
*F16H 61/32* (2006.01)
*F16H 59/68* (2006.01)

(52) U.S. Cl.
CPC ............. *F16H 61/32* (2013.01); *F16H 59/68* (2013.01); *F16H 2061/326* (2013.01)

(58) Field of Classification Search
CPC .............. F16H 61/32; F16H 2061/326; F16H 2061/2838; F16H 59/68
See application file for complete search history.

(56) References Cited

U.S. PATENT DOCUMENTS 6,477,910 B2   11/2002   Ebashi et al.
8,616,079 B2 * 12/2013   Nozaki ................. F16H 61/32
                                                                74/335
(Continued)

FOREIGN PATENT DOCUMENTS

CN    104315134 A    1/2015
CN    105051426 A    11/2015
(Continued)

OTHER PUBLICATIONS

First Office Action mailed to Corresponding Chinese Patent Application No. 202010497718.1 dated Apr. 14, 2022.

*Primary Examiner* — Huan Le
(74) *Attorney, Agent, or Firm* — Rosenberg, Klein & Lee

(57) ABSTRACT

A motor control method of a bistable gear shifter, comprising: determining a current required gear according to a position of a shift lever and a gear judgment strategy; determining whether the current required gear is a P gear, an R gear or an N gear; further determining whether the shift lever is in a second steady state position if it is determined that the current required gear is the P gear, the R gear or the N gear; determining whether a deviation of the position of the shift lever from the second steady state position is greater than or equal to a preset angle value, if it is determined that the shift lever is in the second steady state position; and determining a target angle of the motor as a target opening angle, if it is determined that the deviation is greater than or equal to a preset angle value.

20 Claims, 5 Drawing Sheets

(56) References Cited

U.S. PATENT DOCUMENTS

| | | | |
|---|---|---|---|
| 10,844,952 B2 * | 11/2020 | Sakaguchi | F16H 61/0204 |
| 11,143,290 B2 * | 10/2021 | Kim | F16H 59/105 |
| 2014/0251051 A1 | 9/2014 | Yamada | |

FOREIGN PATENT DOCUMENTS

| | | |
|---|---|---|
| CN | 106641231 A | 5/2017 |
| CN | 107701712 A | 2/2018 |
| CN | 108167428 A | 6/2018 |
| CN | 208123421 U | 11/2018 |
| CN | 208149074 U | 11/2018 |
| CN | 208734856 U | 4/2019 |
| CN | 209430747 U | 9/2019 |
| CN | 110425273 A | 11/2019 |
| CN | 110462264 A | 11/2019 |
| CN | 110469659 A | 11/2019 |
| CN | 110630738 A | 12/2019 |
| DE | 102004057724 A1 | 6/2006 |

\* cited by examiner

MOTOR CONTROL METHOD AND DEVICE OF BISTABLE GEAR SHIFTER AND AUTOMOBILE

CROSS-REFERENCE TO RELATED APPLICATIONS

This application is the 371 application of PCT Application No. PCT/CN2021/097620, filed on Jun. 1, 2021, which is based upon and claims priority to Chinese Patent Application No. 2020497718.1, filed Jun. 4, 2020, the entire contents of which are incorporated herein by reference.

TECHNICAL FIELD

The present application relates to the technical field of automobile control, and more particularly, to a motor control method of a bistable gear shifter, a device and an automobile.

BACKGROUND

Referring to FIG. 1, an automotive electronic control system includes a bistable shift controller 1, a small motor 2, an integral worm 3, a Hall angle and Hall switch module 4, and a vehicle Controller Area Network signal (CAN) network 5. A bistable position shown in FIG. 2 is formed based on the above-mentioned device in FIG. 1. The Hall angle and Hall switch module 4 is configured to detect a first steady state 6, a F1 position 7, a F2 position 8, a B1 position 9, a B2 position 10, a second steady state 11, a position M+ 12 and a position M− 13. The module 4 of Hall angle and Hall switch is further configured to detect a rotation angle of the integral worm 3. The first steady state 6 and the second steady state 11 are distinguished by a Hall switch. The Hall switch is on in the first steady state 6, and the Hall switch is off in the second steady state 12.

FIG. 3 shows a connection between the components. When the shift lever is in the second steady state, the bistable shift controller 1 controls a rotation of the small motor 2, and drives the integral worm 3 to rotate through a turbine worm, and a limit end of the worm (a cam mechanism) 3.1 pushes the shift lever back to a position of the first steady state. After pushing back to the first steady state, the motor is at a position of a reset angle value. If the motor does not return to a position of a target opening angle value, the shift lever cannot be manually moved to the second steady state.

Based on the existing design, when the shifter is quickly shifted to the R gear or the N gear from the D gear, since it takes a certain time for controlling the motor move to the target angle, the motor has not yet reached the target angle that blocks the movement to the second steady state direction, the shift lever can still be quickly dialed to the M+/M− position. In this circumstance, the first problem is: a self-resetting mechanism of the small motor will be stuck, and the system will not work properly. The second problem is: at the M/S gear, the automatic parking function intervenes and the D gear is required, but the shift lever is still in the second steady state.

SUMMARY

There are provided a motor control method of a bistable gear shifter, a device and an automobile according to embodiments of the present disclosure. The technical solution is as below:

According to a first aspect of embodiments of the present disclosure, there is provided a motor control method of a bistable gear shifter, comprising:
  step S11: determining a current required gear according to a position of a shift lever and a gear judgment strategy;
  step S12: determining whether the current required gear is a P gear, an R gear or an N gear;
  step S13: further determining whether the shift lever is in a second steady state position, if it is determined that the current required gear is the P gear, the R gear or the N gear;
  step S14: determining whether a deviation of the position of the shift lever from the second steady state position is greater than or equal to a preset angle value, if it is determined that the shift lever is in the second steady state position; and
  step S15: determining a target angle of the motor as a target opening angle, if it is determined that the deviation of the position of the shift lever from the second steady state position is greater than or equal to a preset angle value.

According to a second aspect of embodiments of the present disclosure, there is provided a motor control device of a bistable gear shifter, comprising:
  a processor; and
  a memory for storing instructions executable by the processor;
  wherein when the processor executes the computer-readable instructions, the following steps are implemented:
  determine a current required gear according to a position of a shift lever and a gear judgment strategy;
  determine whether the current required gear is a P gear, an R gear or an N gear;
  further determine whether the shift lever is in a second steady state position, if it is determined that the current required gear is the P gear, the R gear or the N gear;
  determine whether a deviation of the position of the shift lever from the second steady state position is greater than or equal to a preset angle value, if it is determined that the shift lever is in the second steady state position; and
  determine a target angle of the motor as a target opening angle, if it is determined that the deviation of the position of the shift lever from the second steady state position is greater than or equal to a preset angle value.

According to a third aspect of embodiments of the present disclosure, there is provided an automobile, comprising the above-mentioned motor control device of a bistable gear shifter.

BRIEF DESCRIPTION OF THE DRAWINGS

In order to illustrate technical solutions of embodiments of the present application or technical solutions of the prior art more clearly, the drawings that are used in the description of the embodiments of the present application or the prior art will be introduced briefly as follows. Obviously, the drawings in the following description are only some embodiments of the present application, for those of ordinary skill in the art, other drawings may also be obtained from these drawings without creative labor.

DETAILED DESCRIPTION

In this patent, the specific implementation is further described below with reference to the accompanying drawings and embodiments.

Figure 1:
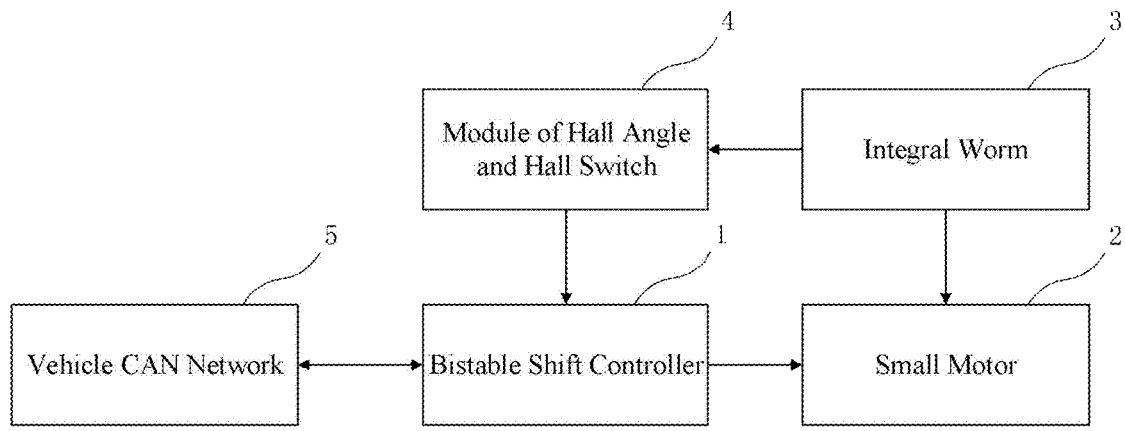
FIG. 1 is a block diagram of an electronic control system according to the background art.
Figure 2:
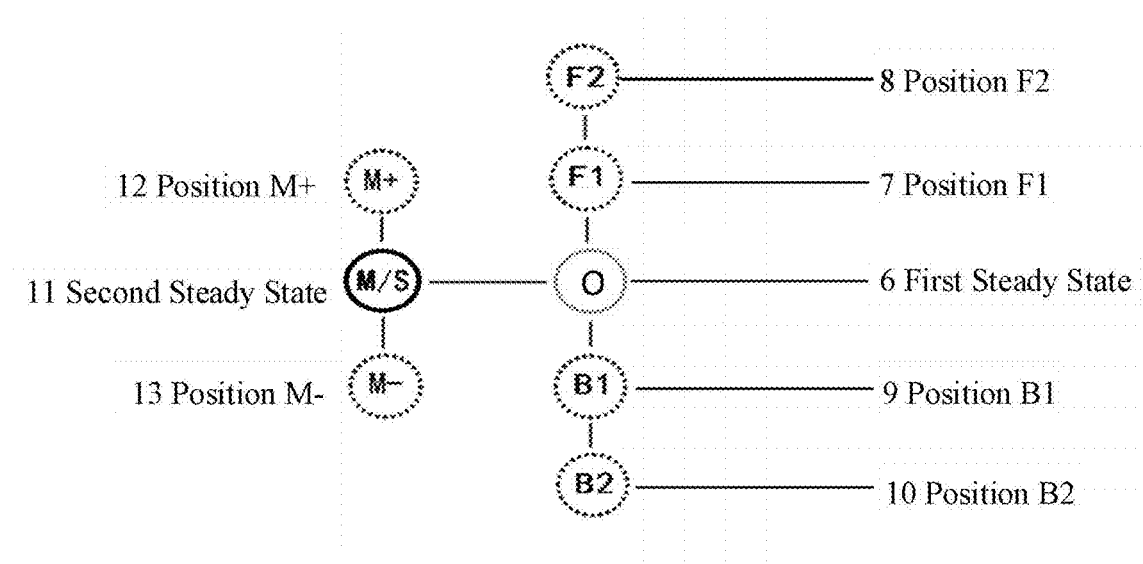
FIG. 2 illustrates a diagram of a bistable position according to the background art.
Figure 3:
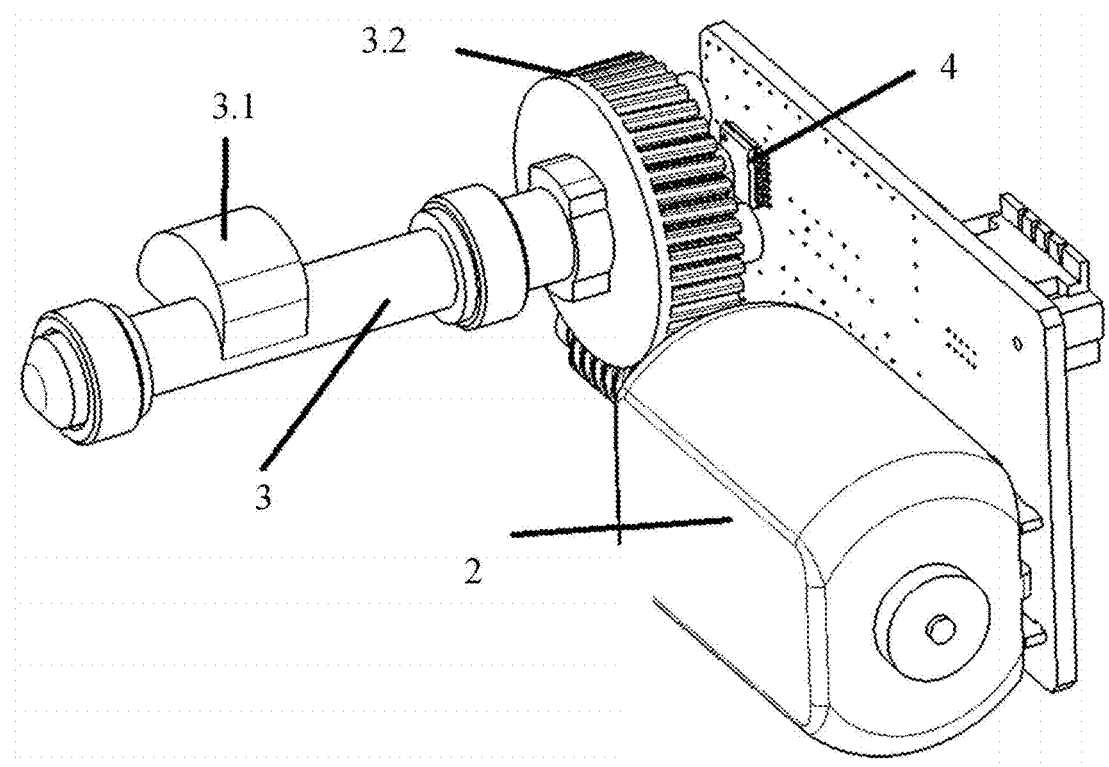
FIG. 3 is a connection diagram of components according to the background art.
Figure 4:
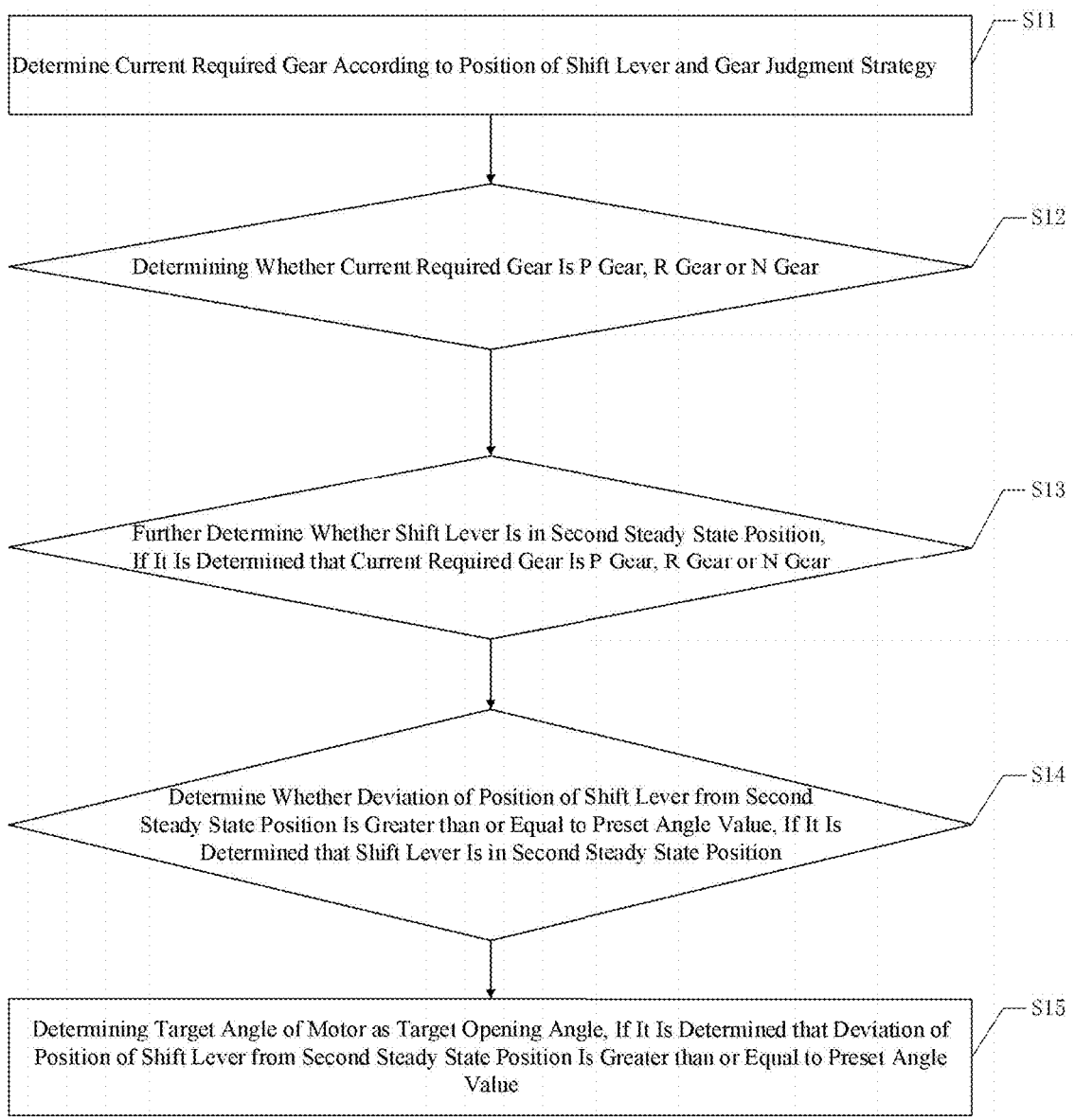
FIG. 4 is a flowchart of a small motor control method of a bistable gear shifter according to an embodiment of the present disclosure.

As shown in FIG. 4, an embodiment of the present disclosure provides a small motor control method of a bistable gear shifter, including the following steps.

Step S11: a current required gear position is determined according to a position of a shift lever and a gear judgment strategy.

It should be noted that, before determining the current required gear, the first detection cycle requires a power-on initialization.

Step S12: whether the current required gear is a P gear, an R gear or an N gear is determined.

Step S13: if it is determined that the current required gear is the P gear, the R gear or the N gear, whether the shift lever is in a second steady state position is further determined.

It should be noted that the current required gear is determined based on a module of Hall angle sensor and Hall switch and a vehicle state.

Step S14: if it is determined that the shift lever is in the second steady state position, whether a deviation of the position of the shift lever from the second steady state position is greater than or equal to a preset angle value is determined.

It should be noted that a Hall angle module is configured to detect the position of the shift lever in this step.

Step S15: if it is determined that a deviation of the position of the shift lever from the second steady state position is greater than or equal to the preset angle value, a target angle of the small motor is determined as a target opening angle.

In this embodiment, when the deviation of the position of the shift lever from the second steady state position is greater than or equal to the preset angle value, it is indicated that the shift lever has reached M+ or M−, and only the target angle of the small motor can be determined as the target opening angle. Only when the deviation of the position of the shift lever from the second steady state position is smaller than the preset angle value, that is, the shift lever returns to the second steady state position, the target angle of the small motor can be determined as the reset angle, so that the small motor can be automatically reset to a first steady state position, to avoid a mechanism stuck due to a forced reset at M+ or M− position.

In an embodiment, the method further includes the following steps.

If it is determined in step S14 that the deviation of the position of the shift lever from the second steady state position is smaller than the preset angle value, the target angle of the small motor is determined as the reset angle.

The small motor is controlled to move to a position of the target angle.

It should be noted that if the deviation of the position of the shift lever from the second steady state position is smaller than the preset angle value, the target angle of the small motor is determined as the reset angle, and the shift lever can automatically return to the first steady state position without the risk of the mechanism stuck.

Figure 5:
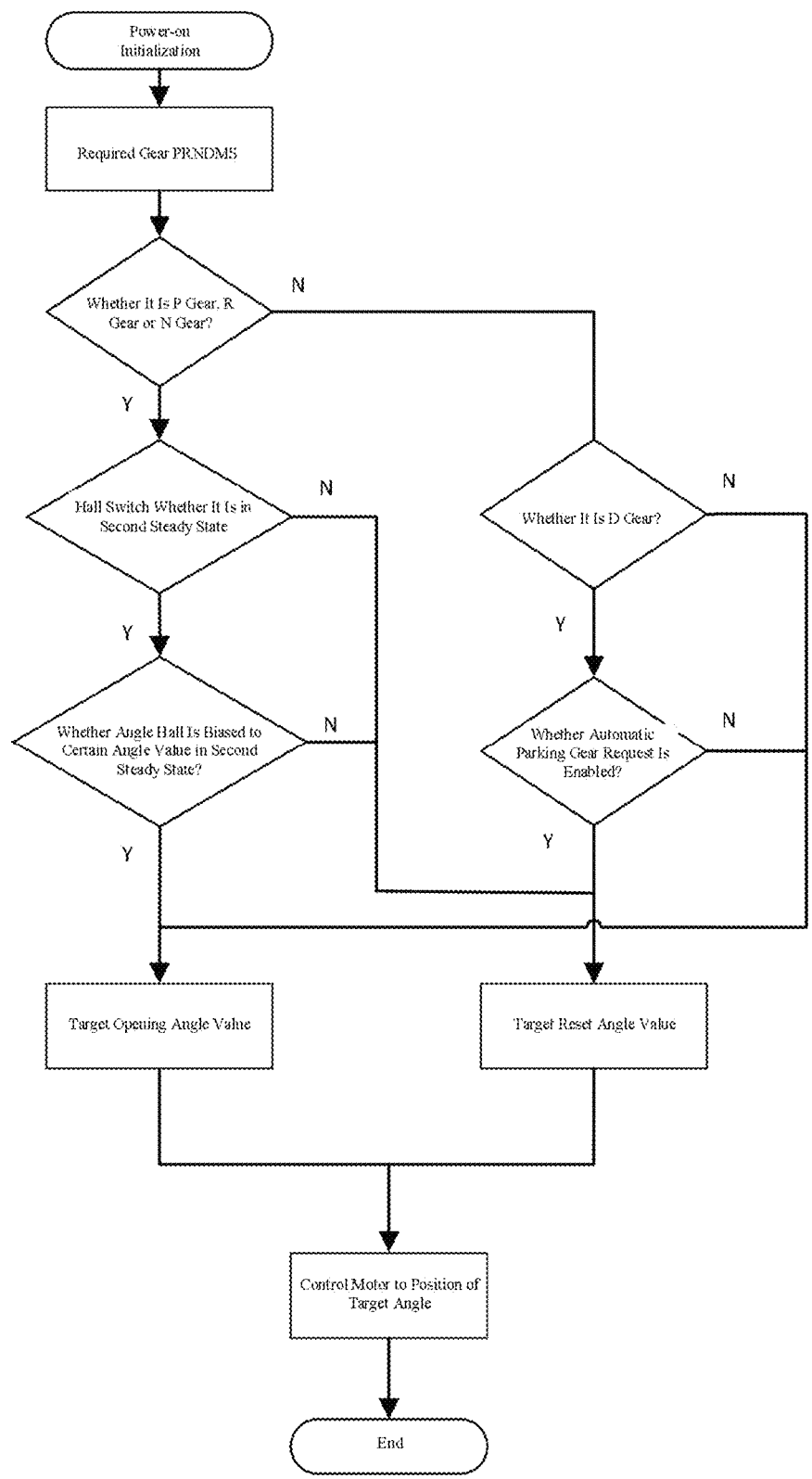
FIG. 5 is a flowchart of a reset control of the small motor according to an embodiment of the present disclosure.

Combined with FIG. 5, the method further includes the following steps.

If it is determined that the current required gear is not the P gear, the R gear and the N gear, whether the current required gear is the D gear is determined.

If it is determined that the current required gear is the D gear, whether to enable an automatic parking is determined according to a Controller Area Network signal (CAN) network signal of the whole vehicle.

If it is determined to enable the automatic parking, the target angle of the small motor is determined as the reset angle.

The small motor is controlled to move to the position of the target angle.

It should be noted that if it is determined that the current required gear is the D gear and the automatic parking function is enabled, the small motor is controlled to automatically reset to the first steady state position.

In an embodiment, the method further includes the following steps.

If it is determined that the current required gear is not the D gear, the target angle of the small motor is determined as the target opening angle.

The small motor is controlled to move to the position of the target angle.

It should be noted that the target angle is the opening angle, so that the driver can shift the shift lever to the second steady state position.

In an embodiment, the method further includes the following steps.

If it is determined not to enable the automatic parking, the target angle of the small motor is determined as the target opening angle.

The small motor is controlled to move to the position of the target angle.

In an embodiment, determining whether to enable automatic parking according to the CAN network signal of the whole vehicle includes the following steps.

Whether a request bit of an automatic parking gear is on is determined according to CAN network signal of the whole vehicle.

If on, it is determined to enable the automatic parking.

Otherwise, it is determined not to enable the automatic parking.

Figure 6:
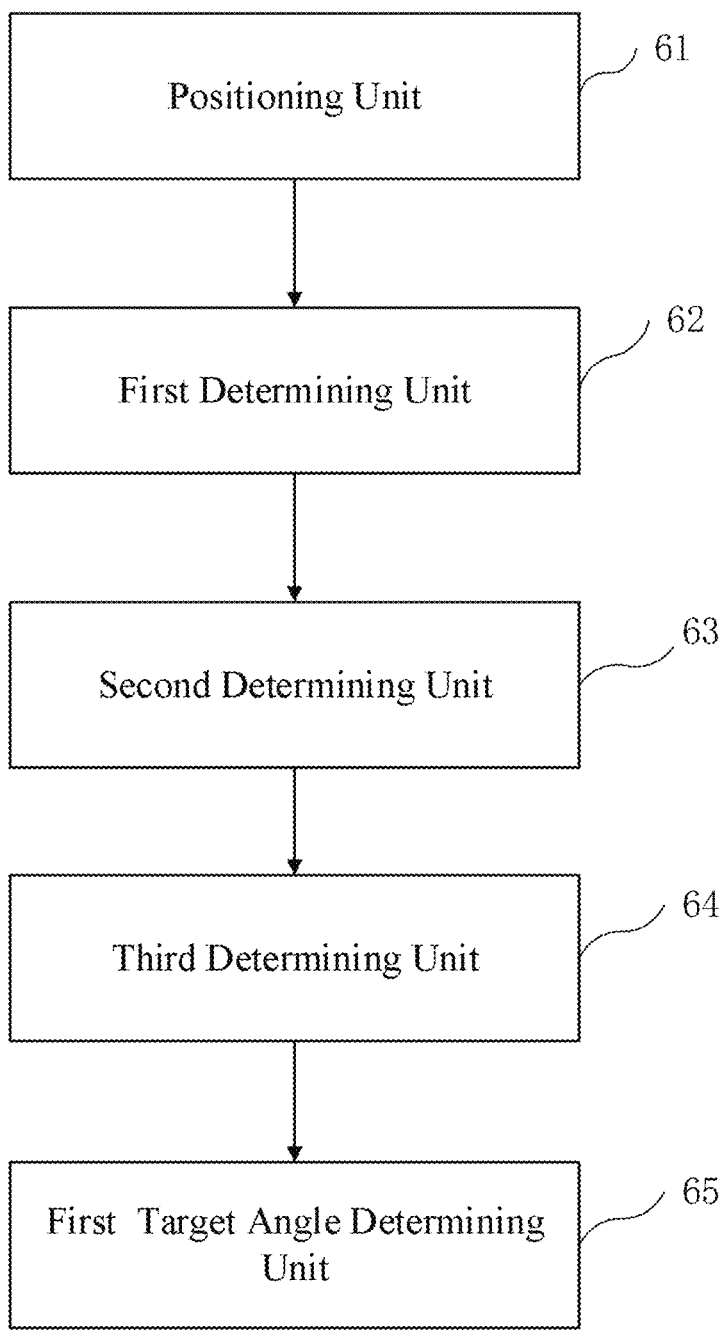
FIG. 6 is a structural diagram of a small motor control device of the bistable gear shifter according to an embodiment of the present disclosure.

As shown in FIG. 6, an embodiment of the present disclosure provides a small motor control device of a bistable gear shifter, including:

- a positioning unit 61, configured to determine a current required gear position according to a position of a shift lever and a gear judgment strategy;
- a first determining unit 62, configured to determine whether the current required gear is a P gear, an R gear or an N gear;
- a second determining unit 63, configured to further determine whether the shift lever is in a second steady state position, when it is determined that the current required gear is the P gear, the R gear or the N gear;
- a third determining unit 64, configured to determine whether a deviation of the position of the shift lever from the second steady state position is greater than or equal to a preset angle value, if it is determined that the shift lever is in the second steady state position; and
- a first target angle determining unit 65, configured to determine a target angle of the small motor as a target opening angle, if it is determined that the deviation of the position of the shift lever from the second steady state position is greater than or equal to the preset angle value.

In an embodiment, the device further includes a control unit, which is configured to determine the target angle of the small motor as the reset angle when the third determining unit 64 determined that the deviation of the position of the shift lever from the second steady state position is less than the preset angle value, and is further configured to control the small motor move to a position of the target angle.

In an embodiment, the device further includes a fourth determining unit, a second target angle determining unit and a control unit. The first determining unit 62 determines whether the current required gear is the D gear, if it is determined that the current gear is not the P gear, the R gear or the N gear.

The fourth determining unit is configured to determine whether to enable the automatic parking according to the CAN network signal of the whole vehicle if it is determined that the current required gear is the D gear.

The second target angle determining unit is configured to determine the target angle of the small motor as the reset angle if it is determined to enable the automatic parking.

The control unit is configured to control the small motor move to the position of the target angle.

An embodiment of the present disclosure further provides a small motor control device of a bistable gear shifter, including a processor and a memory for storing instructions executable by the processor. When the processor executes the computer-readable instructions, the steps of the above-mentioned small motor control method of the bistable gear shifter are implemented.

An embodiment of the present disclosure provides an automobile, including the above-mentioned small motor control device of a bistable gear shifter.

The present disclosure has the following beneficial effects.

Through the present disclosure, a required gear is determined firstly, a position of the shift lever is further determined, and a target angle of the motor is appropriately determined as a target opening angle or a reset angle, thereby solving the problem that the self-resetting mechanism of the small motor is stuck when the shift lever is quickly moved to the M+ or M− position after switching the D gear to the R gear or N gear, and the problem that the shift lever is still in the second steady state, while the automatic parking function intervenes and the D gear is required at the M/S gear.

The above content is a further detailed description of the present disclosure in combination with specific preferred embodiments, which cannot be considered that the specific implementation of the present disclosure is limited to these descriptions. For those of ordinary skill in the technical field of the present disclosure, some simple deductions or substitutions may be made without departing from the concept of the present disclosure, which should be regarded as belonging to the protection scope of the present disclosure.

What is claimed is:

1. A motor control method of a bistable gear shifter, comprising:
   step S11: determining a current required gear according to a position of a shift lever and a gear judgment strategy;
   step S12: determining whether the current required gear is a P gear, an R gear or an N gear;
   step S13: further determining whether the shift lever is in a second steady state position, if it is determined that the current required gear is the P gear, the R gear or the N gear;
   step S14: determining whether a deviation of the position of the shift lever from the second steady state position is greater than or equal to a preset angle value, if it is determined that the shift lever is in the second steady state position; and
   step S15: determining a target angle of the motor as a target opening angle, if it is determined that the deviation of the position of the shift lever from the second steady state position is greater than or equal to the preset angle value.

2. The method of claim 1, further comprising:
   determining the target angle of the motor as a reset angle, if it is determined in step S14 that the deviation of the position of the shift lever from the second steady state position is smaller than the preset angle value; and
   controlling the motor move to a position of the target angle.

3. The method of claim 1, further comprising:
   determining whether the current required gear is a D gear, if it is determined that the current required gear is not the P gear, the R gear and the N gear;
   determining whether to enable an automatic parking according to a Controller Area Network signal of a whole vehicle, if it is determined that the current required gear is D gear;
   determining the target angle of the motor as a reset angle, if it is determined to enable the automatic parking; and
   controlling the motor move to a position of the target angle.

4. The method of claim 3, further comprising:
   determining the target angle of the motor as the target opening angle, if it is determined that the current required gear is not the D gear; and
   controlling the motor move to the position of the target angle.

5. The method of claim 3, further comprising:
   determining the target angle of the motor as the target opening angle, if it is determined not to enable the automatic parking; and
   controlling the motor move to the position of the target angle.

6. The method of claim 3, wherein determining whether to enable the automatic parking according to the Controller Area Network signal network signal of the whole vehicle comprises:
   determining whether a request bit of the automatic parking is on according to the Controller Area Network signal of the whole vehicle;
   if yes, determining to enable the automatic parking; and
   if not, determining not to enable the automatic parking.

7. The method of claim 1, wherein the current required gear is determined based on a module of Hall angle sensor and Hall switch and a vehicle state.

8. The method of claim 1, wherein a Hall angle module is configured to detect the position of the shift lever in step S14.

9. A motor control device of a bistable gear shifter, comprising:
   a processor; and
   a memory for storing instructions executable by the processor;
   wherein when the processor executes the computer-readable instructions, the following steps are implemented:

determine a current required gear according to a position of a shift lever and a gear judgment strategy;

determine whether the current required gear is a P gear, an R gear or an N gear;

further determine whether the shift lever is in a second steady state position, if it is determined that the current required gear is the P gear, the R gear or the N gear;

determine whether a deviation of the position of the shift lever from the second steady state position is greater than or equal to a preset angle value, if it is determined that the shift lever is in the second steady state position; and determine a target angle of the motor as a target opening angle, if it is determined that the deviation of the position of the shift lever from the second steady state position is greater than or equal to the preset angle value.

10. The device of claim 9, wherein when the processor executes the computer-readable instructions, the following steps are further implemented:

determine the target angle of the motor as a reset angle, if it is determined in step S14 that the deviation of the position of the shift lever from the second steady state position is smaller than the preset angle value; and control the motor move to a position of the target angle.

11. The device of claim 9, wherein when the processor executes the computer-readable instructions, the following steps are further implemented:

determine whether the current required gear is a D gear, if it is determined that the current required gear is not the P gear, the R gear and the N gear;

determine whether to enable an automatic parking according to a Controller Area Network signal of a whole vehicle;

determine that the target angle of the motor as a reset angle, if it is determined to enable the automatic parking; and control the motor move to a position of the target angle.

12. The device of claim 11, wherein when the processor executes the computer-readable instructions, the following steps are further implemented:

determining the target angle of the motor as the target opening angle, if it is determined that the current required gear is not the D gear; and controlling the motor move to the position of the target angle.

13. The device of claim 11, wherein when the processor executes the computer-readable instructions, the following steps are further implemented:

determining the target angle of the motor as the target opening angle, if it is determined not to enable the automatic parking; and controlling the motor move to the position of the target angle.

14. The device of claim 11, wherein determining whether to enable the automatic parking according to the Controller Area Network signal network signal of the whole vehicle comprises:

determining whether a request bit of the automatic parking is on according to the Controller Area Network signal of the whole vehicle;

if yes, determining to enable the automatic parking; and if not, determining not to enable the automatic parking.

15. An automobile, comprising a motor control device of a bistable gear shifter, comprising:

a processor; and a memory for storing instructions executable by the processor;

wherein when the processor executes the computer-readable instructions, the following steps are implemented:

determine a current required gear according to a position of a shift lever and a gear judgment strategy;

determine whether the current required gear is a P gear, an R gear or an N gear;

determine whether the shift lever is in a second steady state position, if it is determined that the current required gear is the P gear, the R gear or the N gear;

determine whether a deviation of the position of the shift lever from the second steady state position is greater than or equal to a preset angle value, if it is determined that the shift lever is in the second steady state position; and determine a target angle of the motor as a target opening angle, if it is determined that the deviation of the position of the shift lever from the second steady state position is greater than or equal to the preset angle value.

16. The automobile of claim 15, wherein when the processor executes the computer-readable instructions, the following steps are further implemented:

determine the target angle of the motor as a reset angle, when a third determining unit is configured to determine that the deviation of the position of the shift lever from the second steady state position is smaller than the preset angle value; and control the motor move to a position of the target angle.

17. The automobile of claim 15, wherein when the processor executes the computer-readable instructions, the following steps are further implemented:

determine whether the current required gear is a D gear, if it is determined that the current required gear is not the P gear, the R gear and the N gear;

determine whether to enable an automatic parking according to a Controller Area Network signal of a whole vehicle;

determine the target angle of the motor as a reset angle, if it is determined to enable the automatic parking; and control the motor move to a position of the target angle.

18. The automobile of claim 17, wherein when the processor executes the computer-readable instructions, the following steps are further implemented:

determining the target angle of the motor as the target opening angle, if it is determined that the current required gear is not the D gear; and controlling the motor move to the position of the target angle.

19. The automobile of claim 17, wherein when the processor executes the computer-readable instructions, the following steps are further implemented:

determining the target angle of the motor as the target opening angle, if it is determined not to enable the automatic parking; and controlling the motor move to the position of the target angle.

20. The automobile of claim 17, wherein determining whether to enable the automatic parking according to the Controller Area Network signal network signal of the whole vehicle comprises:

determining whether a request bit of the automatic parking is on according to the Controller Area Network signal of the whole vehicle;
if yes, determining to enable the automatic parking; and
if not, determining not to enable the automatic parking.

* * * * *